United States Patent [19]
Kashiwazaki et al.

[11] Patent Number: 6,084,006
[45] Date of Patent: Jul. 4, 2000

[54] COLOR FILTER, LIQUID CRYSTAL USING THE SAME, MANUFACTURING METHODS THEREOF, AND INK FOR INK JET USED IN THE MANUFACTURING METHOD

[75] Inventors: Akio Kashiwazaki, Yokohama; Katsuhiro Shirota, Kawasaki; Koichiro Nakazawa; Masashi Hirose, both of Tokyo, all of Japan

[73] Assignee: Canon Kabushiki Kaisha, Tokyo, Japan

[21] Appl. No.: 08/925,151

[22] Filed: Sep. 8, 1997

[30] Foreign Application Priority Data

Sep. 30, 1996 [JP] Japan ................................. 8-257242
Sep. 30, 1996 [JP] Japan ................................. 8-257256

[51] Int. Cl.$^7$ ........................... C09D 11/02; C08L 63/00; C08L 75/02; C08F 271/02; C08F 261/04; C08F 265/04; C08F 283/12

[52] U.S. Cl. ................... 523/160; 106/31.27; 106/31.37; 106/31.4; 106/31.6; 106/31.72; 525/117; 525/119; 525/450; 525/451; 525/479

[58] Field of Search ..................... 523/160, 161; 106/31.13, 31.27, 31.29, 31.37, 31.4, 31.41, 31.6, 31.61, 31.72; 525/154, 58, 450, 451, 524, 117, 417, 119; 527/300

[56] References Cited

U.S. PATENT DOCUMENTS

| | | | |
|---|---|---|---|
| 4,207,069 | 6/1980 | Ono ............................................. | 8/471 |
| 4,265,630 | 5/1981 | Bauerle ........................................ | 8/456 |
| 5,143,788 | 9/1992 | Johnson ................................. | 428/423.3 |
| 5,211,747 | 5/1993 | Breton et al. ......................... | 106/31.34 |
| 5,486,549 | 1/1996 | Itagaki et al. ........................... | 523/161 |
| 5,593,757 | 1/1997 | Kashiwazaki et al. ................. | 428/195 |
| 5,667,572 | 9/1997 | Taniguchi et al. ................... | 106/31.36 |
| 5,821,031 | 10/1998 | Hashimoto et al. ................. | 430/280.1 |

FOREIGN PATENT DOCUMENTS

| | | |
|---|---|---|
| 59-75205 | 4/1984 | Japan . |
| 63-235901 | 9/1988 | Japan . |
| 1-217320 | 8/1989 | Japan . |

OTHER PUBLICATIONS

Alger, Mark, Polymer Science Dictionary, Chapman and Hall, London (pp. 180–181), 1997.

Lewis Sr., Richard J., Hawley's Condensed Chemical Dictionary, Van Nostrand Reinhold Co., New York (pp. 468–469), 1993.

*Primary Examiner*—Vasu Jagannathan
*Assistant Examiner*—Callie E. Shosho
*Attorney, Agent, or Firm*—Fitzpatrick, Cella, Harper & Scinto

[57] ABSTRACT

A method for manufacturing a color filter comprises a step for charging an ink comprising a thermosetting resin composition onto an opening of a black matrix provided on a transparent substrate and a step for curing the ink by heat treatment. The thermosetting resin composition comprises either a coloring agent, a multifunctional epoxide having at least two glycidyl groups and a compound crosslinked by the multifunctional epoxide; or a coloring agent, a cellulose-reactive compound and a compound crosslinked by the cellulose-reactive compound.

14 Claims, 6 Drawing Sheets

COLOR FILTER, LIQUID CRYSTAL USING THE SAME, MANUFACTURING METHODS THEREOF, AND INK FOR INK JET USED IN THE MANUFACTURING METHOD

BACKGROUND OF THE INVENTION

1. Field of the Invention

The present invention relates to color filters used in color display devices and the like and methods for manufacturing the same. In particular, the present invention relates to a color filter suitable for color liquid crystal display devices which are used for color television sets, car television sets, personal computers and game machines, a liquid crystal display device using the color filter, methods for manufacturing them, and an ink for ink jet recording which is used in these methods.

2. Description of the Related Art

In recent years, the demand for liquid crystal displays and particularly color liquid crystal displays has increased with growth of the personal computer market and especially the portable personal computer market; consequently, cost reduction of liquid crystal displays and particularly expensive color filters has been greatly needed for further growth of the market. Various methods, as described below, have been attempted in order to achieve cost reductions while satisfying the characteristics required for color filters. No methods satisfying all of the required characteristics, however, have been proposed.

The first attempted method is a staining process, in which a water soluble polymer as a staining material is applied on a glass substrate, the coating film is subjected to photolithography to form a given pattern, and the substrate is dipped into a staining bath to form a colored pattern. These procedures are repeated three times to form red (R), green (G) and blue (B) colored layers.

The second attempted method is a pigment dispersion process which has taken the place of the staining method, recently. In this process, a photosensitive resin layer containing dispersed pigment is formed on a substrate, and subjected to patterning to obtain a given pattern. The procedures are repeated three times to form R, G and B colored layers.

The third method is an electrodeposition process, in which a transparent electrode pattern is formed on a substrate, and the substrate is dipped into an electrodeposition solution containing a pigment, a resin and an electrolytic solution to electro-deposit a first color. The procedures are repeated three times to form R, G and B colored layers, followed by baking.

The fourth method includes dispersing a pigment in a thermosetting resin and printing the dispersion. The procedures are repeated three times to form R, G and B colored layers and the substrate is heated to cure the thermosetting resin. Protective films are generally formed on the colored layers in all the processes.

One of common problems of these processes is high production cost due to triplicated coloring or staining procedures which are unavoidable in order to form R, G and B colored layers. Further, such repeated procedures result in a decreased yield. In the electrodeposition process, the shape of the formable pattern is limited, and thus a color filter prepared by this process is not applicable to thin film transistor (TFT) substrates in the current technology. The printing process is not suitable for fine pitch patterning due to inferior resolution and smoothness.

In order to overcome these problems, methods for manufacturing color filters by means of ink jet processes are disclosed in Japanese Patent Laid-Open Nos. 59-75205, 63-235901 and 1-217320. These methods, however, are not satisfactory.

SUMMARY OF THE INVENTION

It is an object of the present invention to provide a high-definition, reliable color filter which satisfies essential characteristics, such as heat resistance, solvent resistance and image resolution, and prevents color mixing, uneven coloring, and coloring defects.

It is another object of the present invention to reduce the number of steps needed to produce a color filter by use of an ink jet process and thus reduce the production cost of liquid crystal devices.

In accordance with the present invention, a method for manufacturing a color filter comprises a step for charging an ink comprising a thermosetting resin composition onto an opening of a black matrix provided on a transparent substrate and a step for curing the ink by heat treatment, the thermosetting resin composition comprising: a coloring agent, a multifunctional epoxide having at least two glycidyl groups and a compound crosslinked by the multifunctional epoxide; or a coloring agent, a cellulose-reactive compound and a compound crosslinked by the cellulose-reactive compound.

Another aspect of the present invention is a color filter made by the above-mentioned method.

A further aspect of the present invention is a liquid crystal display device comprising a liquid crystal composition inserted between a pair of substrates each having an electrode, in which the above-mentioned color filter is provided on one of the substrates.

A further aspect of the present invention is a method for manufacturing a liquid crystal display device comprising a liquid crystal composition inserted between a pair of substrates, each having an electrode, in which a color filter made by the above-mentioned method is provided on one of the substrates.

Still another aspect of the present invention is a method for manufacturing a liquid crystal display device comprising a liquid crystal composition inserted between a TFT substrate having a color filter and an electrode substrate arranged opposite the TFT substrate, in which the color filter is made by the above-mentioned method, and the pixel sections of the substrate provided with the formed TFT array are indented.

A still further aspect of the present invention is an ink for ink jet recording comprising a thermosetting resin composition comprising a coloring agent, a multifunctional epoxide having at least two glycidyl groups and a compound crosslinked by the multifunctional epoxide.

A still further aspect of the present invention is an ink for ink jet recording comprising a thermosetting resin composition comprising a coloring agent, a cellulose-reactive compound and a compound crosslinked by the cellulose-reactive compound.

The methods in accordance with the present invention permit simplified production of a color filter having high heat resistance, solvent resistance and resolution, not having color mixing, uneven coloring or coloring defects, and not discoloring or cracking during the production steps. An inexpensive and reliable liquid crystal device provided with the color filter can also be produced without deterioration due to heat treatment and solvents employed in the following steps.

DETAILED DESCRIPTION OF THE PREFERRED EMBODIMENTS

The present invention will now be described in detail with reference to the drawings.

A first embodiment of a method for manufacturing a color filter in accordance with the present invention is shown in FIGS. 1A to 1D. The following Steps A to D correspond to FIGS. 1A to 1D, respectively. This embodiment is an example of the formation of a color filter, in which a black matrix is provided on a substrate, and an ink in accordance with the present invention is charged on indented sections formed by the open sections of the black matrix by an ink jet system.

Step A

Figure 1A:
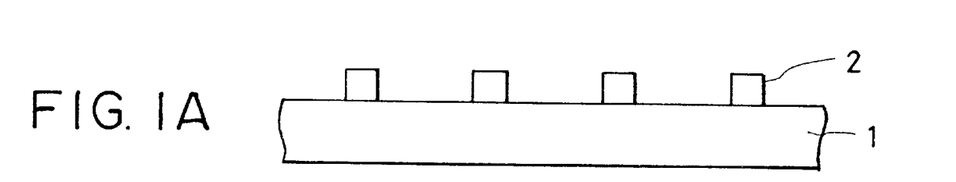
FIGS. 1A to 1D are outlined cross-sectional views of a first embodiment of a method for manufacturing a color filter in accordance with the present invention.

A black matrix 2 is formed on a substrate 1. Indented sections for charging an ink are thereby formed in the openings of the black matrix 2. In the present invention, a glass substrate is generally used as the substrate 1, but other substrates can be used as long as they have transparency and mechanical strength, which are essential characteristics for color filters for liquid crystals. The black matrix 2 can be formed by a conventional photolithographic process using a black-pigment-containing resin (resist). It is preferable that the thickness of the black-pigment-containing resin matrix be at least 0.5 μm. At a thickness of less than 0.5 μm, the optical density of the black matrix decreases to an extent that the black matrix does not function satisfactorily. Further, the charged ink floods out of the indented sections, resulting in the mixing of different color inks.

Step B

Figure 1B:
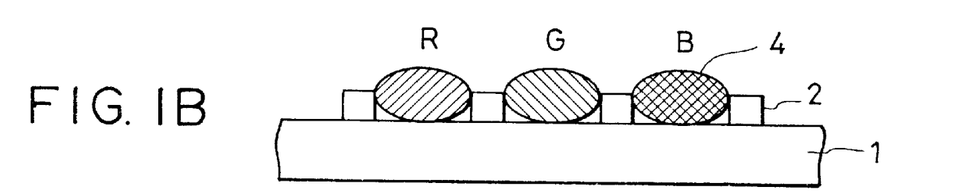

R, G and B inks are discharged toward the substrate by an ink jet process so as to embed the inks in the indented sections -in order to form a color pattern. The R-G-B pattern may also be formed by a casting process. It is preferred that the color inks be charged on the black matrix 2 so that they do not overlap with each other.

The ink used in the present invention comprises (1) a thermosetting resin composition comprising a coloring agent, a multifunctional epoxide having at least two glycidyl groups and a compound crosslinked by the epoxide (hereinafter referred to as ink (1)), or (2) a thermosetting resin composition comprising a coloring agent, a cellulose-reactive compound and a compound crosslinked by the cellulose-reactive compound (hereinafter referred to as ink (2)).

Examples of usable coloring agents include dyes and pigments. Non-limiting examples of dyes include C. I. Acid Red 118, C. I. Acid Red 254, C. I. Acid Green 25, C. I. Acid Blue 113, C. I. Acid Blue 185 and C. I. Acid Blue 7. Non-limiting examples of pigments include C. I. Pigment Red 177, C. I. Pigment Red 5, C. I. Pigment Red 12, C. I. Pigment Green 36, C. I. Pigment Blue 209 and C. I. Pigment Blue 16. These dyes and pigments are preferably used in amounts of approximately 0.1 to 20 percent by weight of the inks.

The multifunctional epoxide having at least two glycidyl groups, which is contained in ink (1) in accordance with the present invention, is used as a crosslinking agent and reacts with functional groups having active hydrogen atoms, e.g. hydroxyl groups, carboxyl groups and amino groups. The epoxide also reacts with acid anhydrides. Examples of the multifunctional epoxides include ethylene glycol diglycidyl ether, polyethylene glycol diglycidyl ether, propylene glycol diglycidyl ether, polypropylene glycol diglycidyl ether, neopentyl glycol diglycidyl ether, glycerol polyglycidyl ether, polyglycerol polyglycidyl ether, trimethylolpropane polyglycidyl ether, diglycerol polyglycidyl ether, sorbitol polyglycidyl ether, sorbitan polyglycidyl ether, pentaerythritol polyglycidyl ether, triglycidyl tris(2-hydroxyethyl) isocyanurate and adipic acid diglycidyl ether.

It is preferable that the multifunctional epoxide having at least two glycidyl groups be used in an amount of 0.01 to 10 percent by weight of the ink. These multifunctional epoxides can be used alone or in combination.

The compound crosslinked by the multifunctional epoxide contained in the ink in accordance with the present invention is not limited as long as it has at least one active hydrogen, such as a hydroxyl group, a carboxyl group or an amino group and the ink is hardened by heat treatment. It is preferable that the compound be a polymeric compound in order to achieve satisfactory heat resistance and solvent resistance. Examples of the compounds include polyvinyl alcohol; acrylic resins, such as polyacrylic acid, polymethacrylic acid, polyacrylate esters, polymethacrylate esters and polyhydroxymethyl methacrylate; silicone resins, epoxy resins; cellulose derivatives, such as hydroxypropyl cellulose, hydroxyethyl cellulose, methyl cellulose and carboxymethyl cellulose and modified derivatives thereof; and polyvinyl pyrrolidone. These polymeric compounds can be used alone or in combination. It is preferable that the compound crosslinked by the multifunctional epoxide be used in the ink in an amount of 0.05 to 20 percent by weight.

The cellulose-reactive compound, which is contained in ink (2) in accordance with the present invention, is a generic group of compounds which react with hydroxyl groups in the cellulose. The cellulose-reactive compound also reacts with functional groups having a reactive hydrogen atom, e.g., a carboxyl group or an amino group. Examples of cellulose-reactive compounds include dimethylolurea, dimethylolethyleneurea, dimethylolalkyltriazone, methylated dimethylolurone, dimethylol glyoxal monoureine, dimethylolpropyleneurea and derivatives thereof. Among these, dimethylolurea, dimethylolethyleneurea, and their derivatives are preferably used in order to obtain satisfactory results in the present invention. It is preferable that the cellulose-reactive compound be used in the ink in an amount of 0.01 to 10 percent by weight. The cellulose-reactive compounds may be used alone or in combination.

The compound crosslinked by the cellulose-reactive compound contained in the ink in accordance with the present invention-is not limited as long as it has at least one active hydrogen, such as a hydroxyl group, a carboxyl group or an amino group, and the ink is hardened by heat treatment. It is preferable that the compound be a polymeric compound in order to achieve satisfactory heat resistance and solvent resistance. Examples of the compounds include polyvinyl alcohol; acrylic resins, such as polyacrylic acid, polymethacrylic acid, polyacrylate esters, polymethacrylate esters and polyhydroxymethyl methacrylate; silicone resins, epoxy resins; cellulose derivatives, such as hydroxypropyl cellulose, hydroxyethyl cellulose, methyl cellulose and carboxymethyl cellulose and modified derivatives thereof; and polyvinyl pyrrolidone. These polymeric compounds can be used alone or in combination. It is preferable that the compound crosslinked by the cellulose-reactive compound be used in the ink in an amount of 0.05 to 20 percent by weight.

Aqueous solvents suitable for the ink in accordance with the present invention used in ink jet processes are mixtures of water and water soluble organic solvents. It is preferable that deionized water (ion-exchanged water) be used instead of ordinary water containing various ions.

Examples of the water soluble organic solvents which can be used with water include alkyl alcohols having 1 to 4 carbon atoms, e.g. methyl alcohol, ethyl alcohol, n-propyl alcohol, isopropyl alcohol, n-butyl alcohol, sec-butyl alcohol and tert-butyl alcohol; amides, e.g. dimethyl formamide and dimethyl acetamide; ketones and ketoalcohols, e.g. acetone and diacetone alcohol; ethers, e.g. tetrahydrofuran and dioxane; polyvalent alcohols, such as polyethylene glycol and polypropylene glycol, alkylene glycols in which each alkylene group has 2 to 6 carbon atoms, e.g. ethylene glycol, propylene glycol, butylene glycol, triethylene glycol, 1,2,6-hexane triol, thiodiglycol, hexylene glycol and diethylene glycol, glycerol; lower alkyl ethers of polyvalent alcohols, e.g. ethylene glycol monomethyl (or monoethyl) ether, diethylene glycol monomethyl (or monoethyl) ether and triethylene glycol monomethyl (or monoethyl) ether; and miscellaneous solvents, e.g. N-methyl-2-pyrrolidone, 2-pyrrolidone, and 1,3-dimethyl-2-imidazolidinone. Among them, polyvalent alcohols such as diethylene glycol, and lower alkyl ethers of polyvalent alcohols such as triethylene glycol monomethyl (or monoethyl) ether are preferably used.

The ink preferably contains a lower alkyl ether of ethanol, isopropyl alcohol or a polyvalent alcohol in order to achieve stable discharge from ink jet printers. The addition of such a solvent is considered to provide for stable foaming on thin film resistance elements in bubble-jet-type ink jet printers.

The ink in accordance with the present invention can also include a surfactant, a defoaming agent, an antiseptic agent and a commercially available aqueous dye, if necessary, according to the required physical properties.

For example, any surfactants not adversely affecting the shelf life can be used. Examples of such surfactants include anionic surfactants, e.g. fatty acid salts, higher alcohol sulfate ester salts, liquid fatty oil sulfate ester salts and alkyl allyl sulfate salts; and nonionic surfactants, e.g. polyoxyethylene alkyl ethers, polyoxyethylene alkyl esters, polyoxyethylene sorbitan alkyl esters, acetylene alcohol and acetylene glycol. These surfactants may be used alone or in combination.

Further, the ink in accordance with the present invention may contain organic ammonia; amines, e.g., diethanol amine and triethanol amine; inorganic alkalies such as alkaline metal hydroxides, e.g. sodium hydroxide, lithium hydroxide and potassium hydroxide; organic acids and inorganic acids, in order to adjust the ink's pH which determines the shelf life of the ink.

Ink jet processes usable in the present invention include bubble jet types using electrothermal transducers as energy sources, and piezo-jet types using piezoelectric devices. The discharge area and pattern can be appropriately determined according to need.

Step C

Figure 1C:
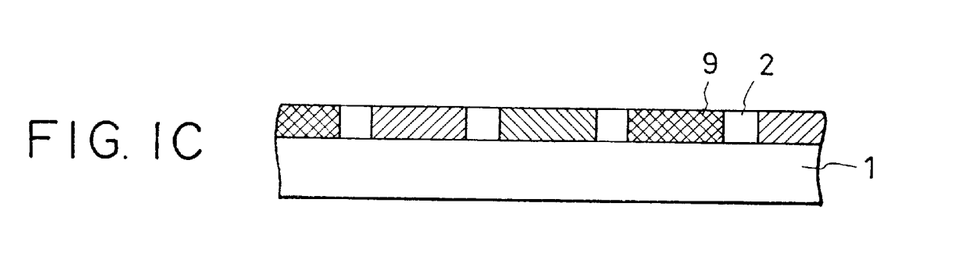

The discharged ink 4 is hardened or cured by heat treatment to form a color filter 9. It is preferable that the substrate be treated at a temperature of 150° C. or more in order to form a color filter which has sufficiently high thermal resistance and solvent resistance, and is resistant to heat and solvent treatment in the following steps.

Step D

Figure 1D:
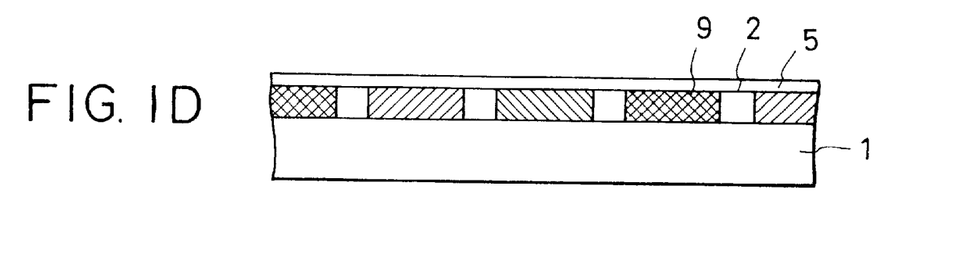

A resin composition is applied onto the entire substrate surface and cured by light irradiation and/or thermal treatment to form a protective film 5. Any resin which is transparent and durable to the following ITO (indium tin oxide) forming and alignment film forming processes can be used as the resin composition. The protective film 5 provided on the color filter is not always necessary.

Next, a second embodiment of a method for manufacturing a color filter in accordance with the present invention will be described. The following Steps A to E correspond to FIGS. 2A to 2E. In this embodiment, the ink is charged after an ink receiving layer is formed on a color-filter-forming surface.

Step A

Figure 2A:
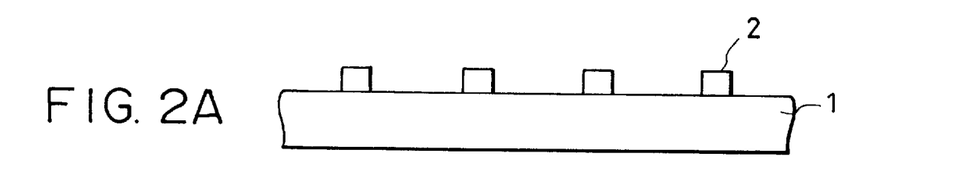
FIGS. 2A to 2E are outlined cross-sectional views of a second embodiment of a method for manufacturing a color filter in accordance with the present invention.

As in the first embodiment, a glass substrate 1 provided with a black matrix 2 is prepared.

Step B

Figure 2B:
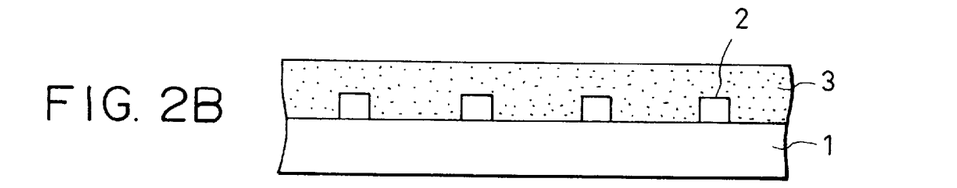

A resin composition is applied to the entire substrate surface to provide an ink receiving layer 3. The ink receiving layer 3 receives ink and adjusts the spread of the charged ink to a desirable size. The ink receiving layer 3 is composed of a resin composition having process resistance, e.g., thermal resistance. Preferable resins have moderate or weak water repellency and oil repellency. Examples of preferable resins include acrylic resins, epoxy resins and imide resins. The resin composition may be curable by heat and/or light. The curable resin composition may be cured after ink discharge.

The resin composition can be applied by a spin coating process, a roll coating process, a bar coating process, a spray coating process or a dip coating process.

Step C

Figure 2C:
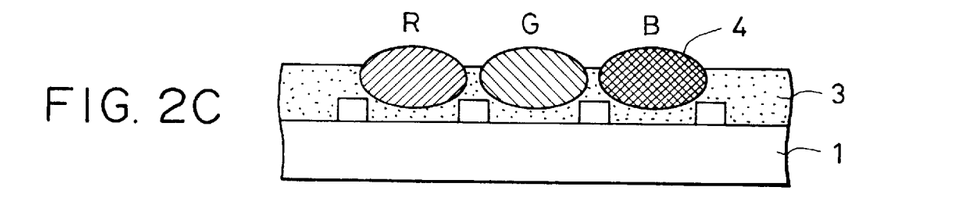

R, G and B inks 4 are discharged on the ink receiving layer 3 by an ink jet printer.

Step D

Figure 2D:
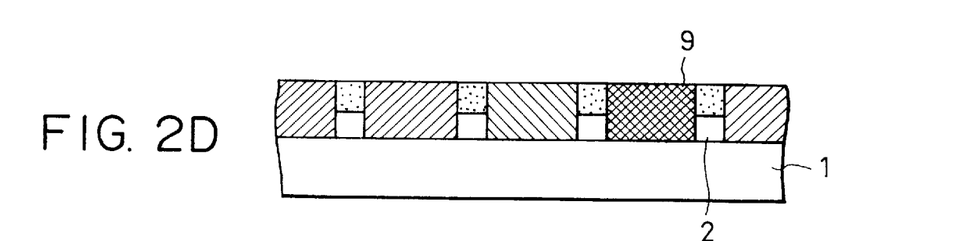

The inks and the ink receiving layer are cured by thermal treatment and then optional light irradiation to form a color filter 9.

Step E

Figure 2E:
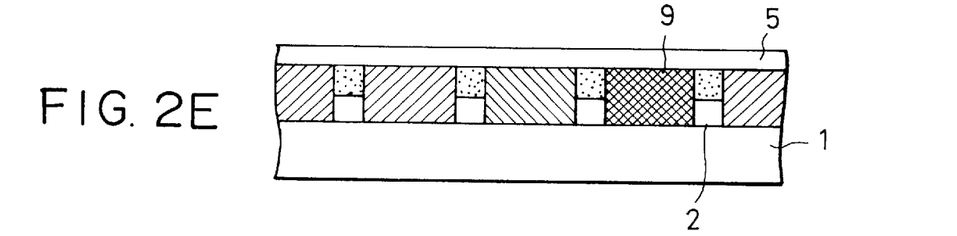

As in the first embodiment, a resin composition is applied to the entire substrate surface and cured by light irradiation and/or heat treatment to form a protective film 5.

Figure 3:
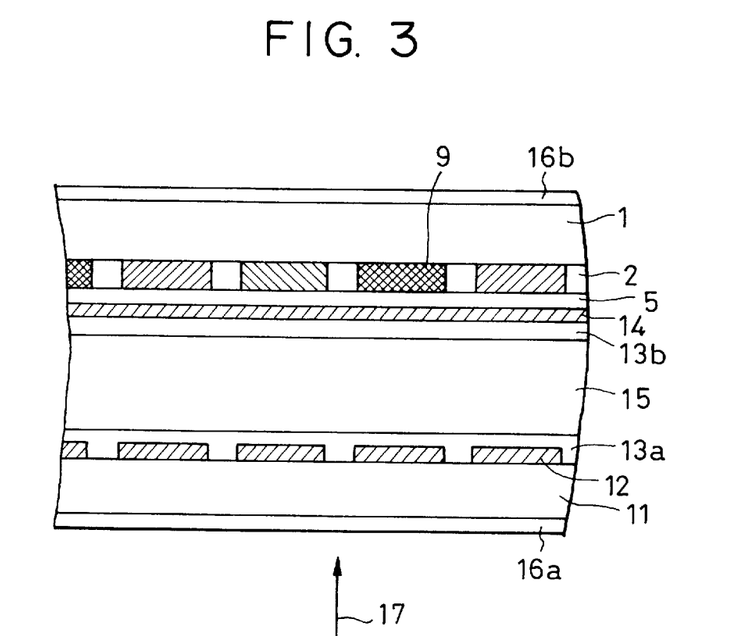
FIG. 3 is an outlined cross-sectional view of a TFT color liquid crystal device provided with a color filter obtained by the first embodiment shown in FIGS. 1A to 1D.

FIG. 3 is an outlined cross-sectional view of an embodiment of a display section of a liquid crystal device in accordance with the present invention, in which a color filter in accordance with the first embodiment is assembled. The second embodiment represents a TFT color liquid crystal device.

The TFT color liquid crystal device includes a substrate 1 provided with a color filter 9, a substrate 11 provided with a TFT matrix, these two substrates being bonded to each other with a sealing agent not shown in the drawing, and a liquid crystal compound 15 encapsulated into the gap (2 to 5 μm) between the two substrates. A TFT (not shown in the drawing) matrix and a pixel electrode matrix 12 are formed on the inner surface of one substrate. A color filter matrix 9 is formed on the inner surface of the other substrate so as to overlap with the pixel electrode matrix 12. Protective film 5 is formed on the inner surface of the substrate with the color filter matrix, and a transparent counter or common electrode 14 is formed thereon over the entire surface. Further, alignment films 13a and 13b are formed on the inner surfaces of the two substrates and subjected to rubbing in order to achieve unidirectional alignment of liquid crystal molecules. The outer surfaces of the glass substrates are provided with polarizing plates 16a and 16b. The back light 17 used consists of fluorescent light and scattered light (the drawing does not show both), and the liquid crystal composition acts as a light shutter, which changes transmittance of the back light 17, for displaying images.

Examples of preferable liquid crystal devices in the present invention include twisted nematic (TN) liquid crystals and ferroelectric liquid crystals (FLCs).

Figure 4:
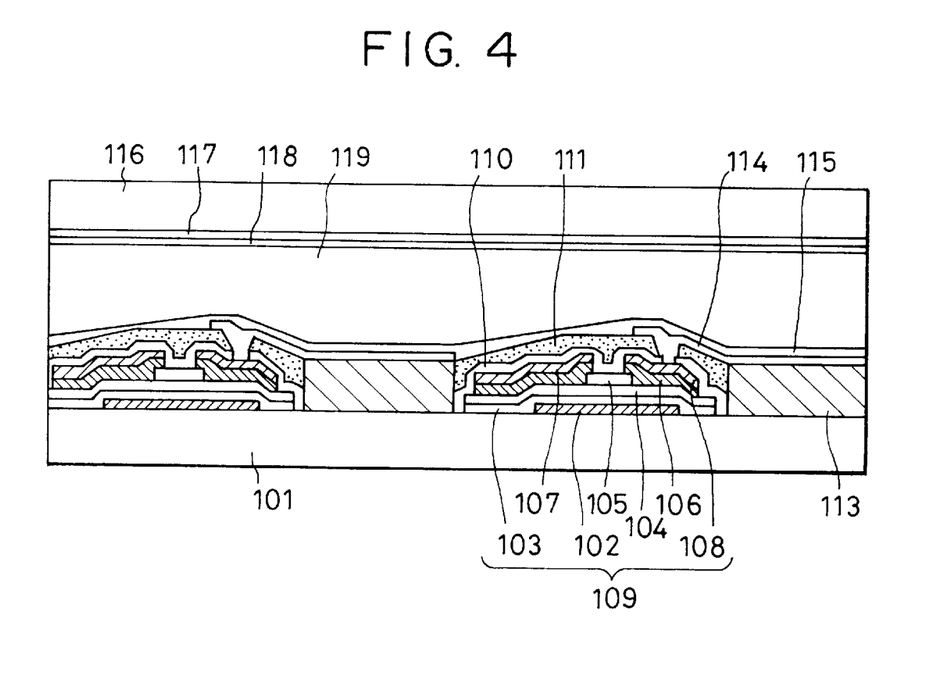
FIG. 4 is an outlined cross-sectional view of a TFT color liquid crystal device in which a color filter in accordance with the present invention is provided on a TFT substrate.
Figure 5:
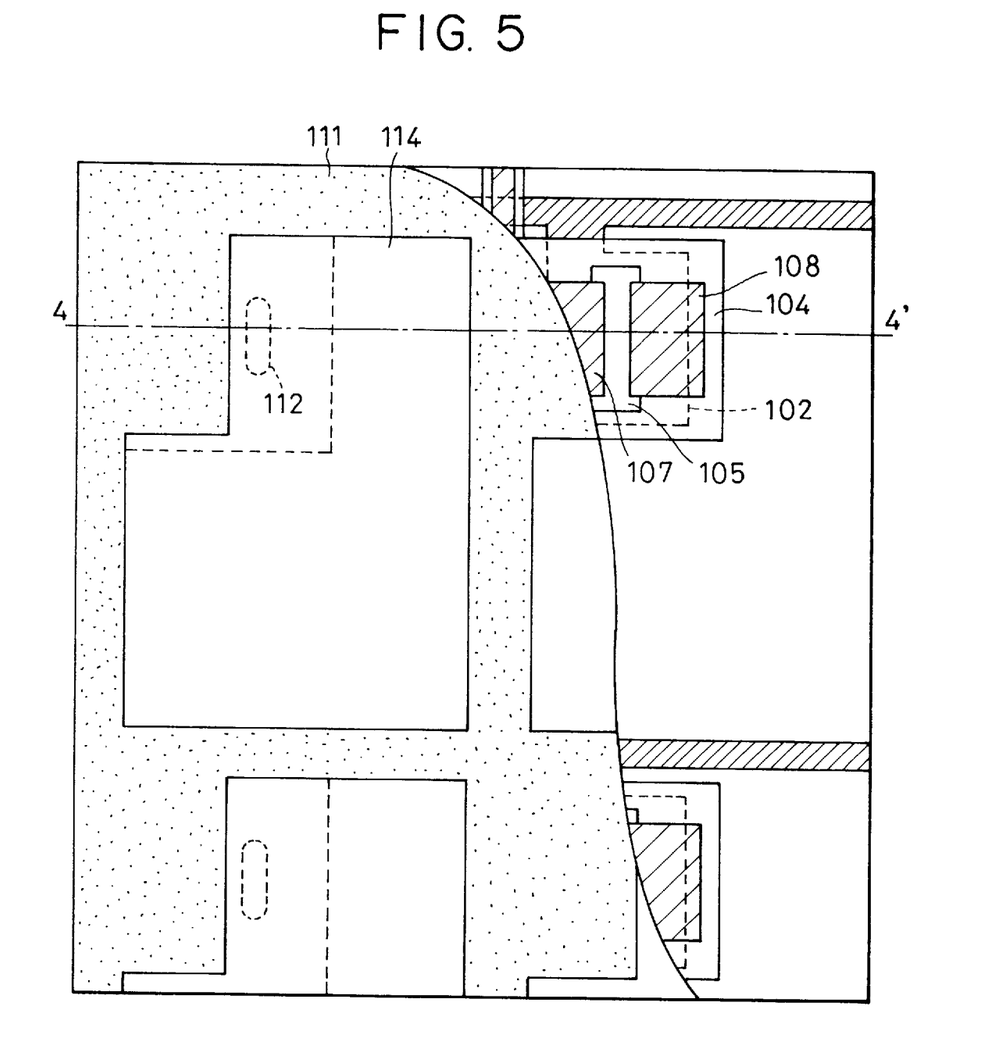
FIG. 5 is an outlined plan view of the TFT substrate shown in FIG. 4.

Although the color filter is provided on the substrate opposite to the TFT substrate in FIG. 3, the black matrix 2 and the color filter 9 can be provided on the TFT substrate. FIG. 4 is an outlined cross-sectional view of a display section of such a liquid crystal, and FIG. 5 is a plan view of such a TFT substrate, wherein for conciseness no pixel electrodes are shown. FIG. 4 is taken along the 4–4' cross-section in FIG. 5. As shown in FIG. 4, a TFT pattern comprising a gate electrode 102, a gate insulating film 103, an i-type amorphous silicon film 104, an etching stop layer 105, an ohmic contact layer 106, a source electrode 107 and a drain electrode 108 is formed on a first glass substrate 101. Each drain electrode 108 is connected to a transparent pixel electrode 114 through a passivation film 110 and a light screening film 111. A color filter 113 is provided between the transparent pixel electrode 114 and the glass substrate 101. An alignment film 115 is formed on the entire surfaces of the TFT 109 and the transparent pixel electrode 114.

On the other hand, a common transparent electrode 117 and an alignment film 118 are formed on a second glass substrate 116. The first glass substrate 101 and the second glass substrate 116 are disposed opposite each other with a gap of approximately 5 μm between them, and the gap between the two electrodes is filled with liquid crystal 119. FIG. 5 also shows contact hole 112 which connects the transparent pixel electrode 114 to the drain electrode 108.

FIGS. 6A to 6K are cross-sectional views illustrating production steps of a liquid crystal in accordance with this embodiment. These steps will now be described, wherein the following Steps A to K correspond to FIGS. 6A to 6K.

Step A

Figure 6A:
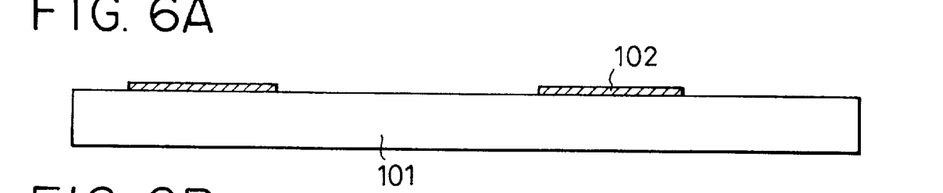
FIGS. 6A to 6K are cross-sectional views illustrating production steps for making the liquid crystal device shown in FIGS. 4 and 5.

A gate electrode 102 composed of Cr, Ta or the like and having a thickness of approximately 2,000 angstroms is formed on a glass substrate 101.

Step B

Figure 6B:
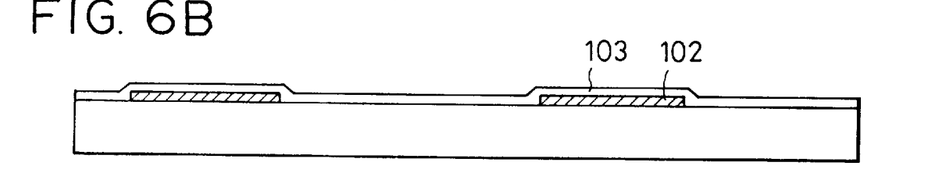

A gate insulating film 103 having a thickness of approximately 5,000 angstroms is formed on the gate electrode 102. A single-layered film composed of SiN, $Si_3N_4$, TaO or $Ta_2O_5$ or a multilayered film comprising a plurality of single-layered films is used as the gate insulating film.

Step C

Figure 6C:
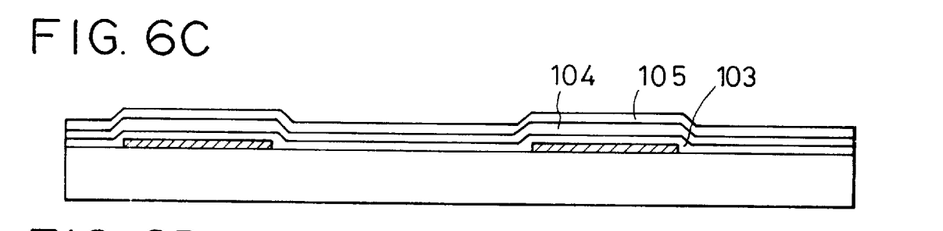

An i-type amorphous silicon film 104 having a thickness of approximately 2,000 angstroms and an etching stop layer 105 are formed on the gate insulating film 103. The etching stop layer 105 protects the i-type amorphous silicon film 104 as a channel region during Step F, i.e., an etching step as described below. The etching stop layer 105 is formed using a material having a different etching rate from those of the i-type amorphous silicon film 104 and the ohmic contact layer described below, and may be, for example, an insulating film composed of SiN or $Si_3N_4$.

Step D

Figure 6D:
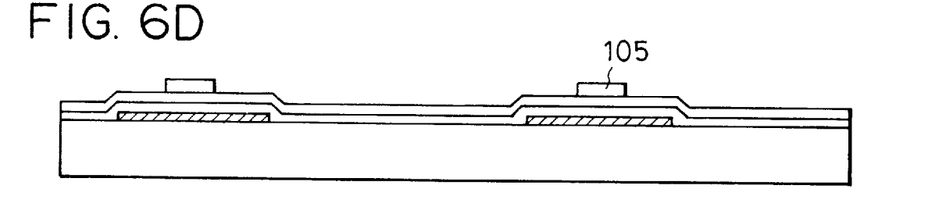

The etching stop layer 105 is subjected to patterning.

Step E

Figure 6E:
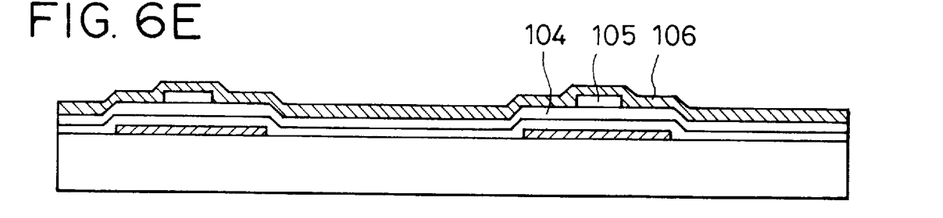

An ohmic contact layer 106 having a thickness of approximately 3,000 angstroms is formed on the i-type amorphous silicon film 104 and the etching stop layer 105. The ohmic contact layer 106 is generally composed of $n_+$-type amorphous silicon or microcrystal silicon.

Step F

Figure 6F:
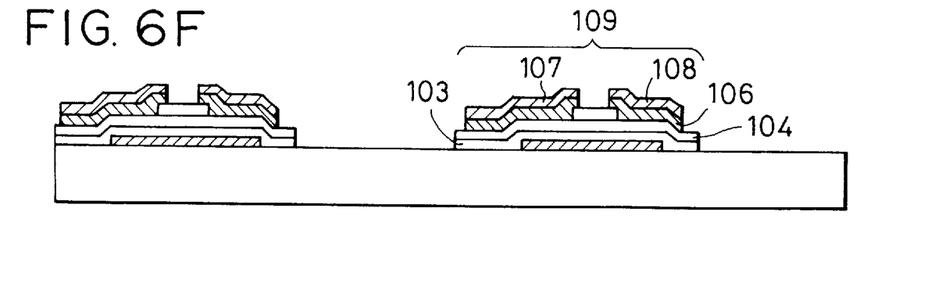

A source electrode 107 and a drain electrode 108 are formed on the ohmic contact layer 106, and unnecessary sections of the ohmic contact layer 106, the i-type amorphous silicon film 104 and the gate insulating film 103 are removed by an etching process to form a TFT 109. The source electrode 107 and the drain electrode 108 are generally composed of Al or Mo.

Step G

Figure 6G:
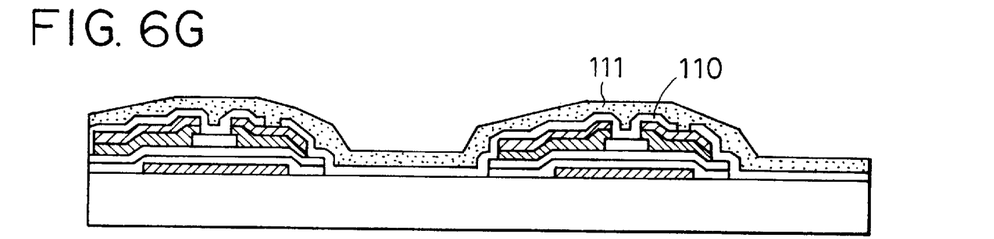

The TFT is covered with a passivation film 110 composed of SiN or the like, and a light screening layer 111 composed of a resin is formed thereon. In this embodiment, the light screening layer 111 blocks light that may cause malfunction of the TFT, and corresponds to the black matrix in the first embodiment. The same material as the black matrix material in the first embodiment therefore is applied and subjected to mask exposure.

Step H

Figure 6H:
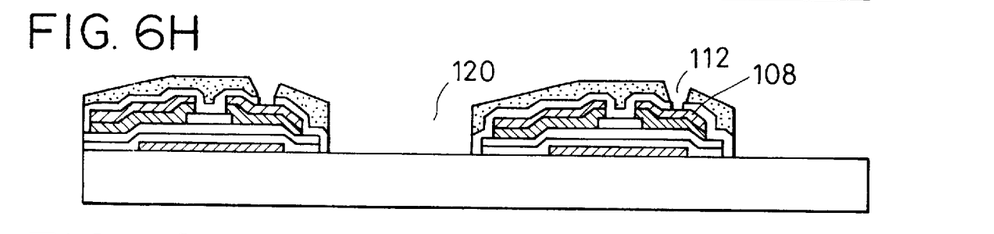

The passivation film and the light screening film on the open region 120 are developed and a contact hole 112 is formed on the drain electrode 108.

Step I

Figure 6I:
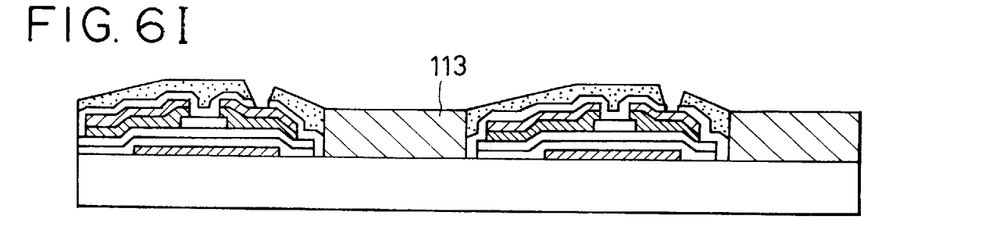

A color filter 113 is formed on the opening region. Inks in accordance with the present invention are charged on given positions with an ink jet printer and cured by heat treatment to form the color filter 113.

Step J

Figure 6J:
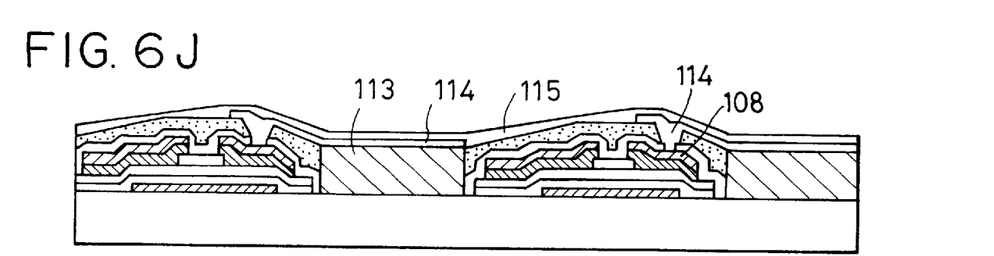

A transparent pixel electrode 114 composed of ITO is formed on the color filter 113, and is connected to the drain electrode 108 through the contact hole. An alignment film 115 composed of polyimide is formed on the entire surface of the TFT and the transparent pixel electrode 114.

Step K

Figure 6K:
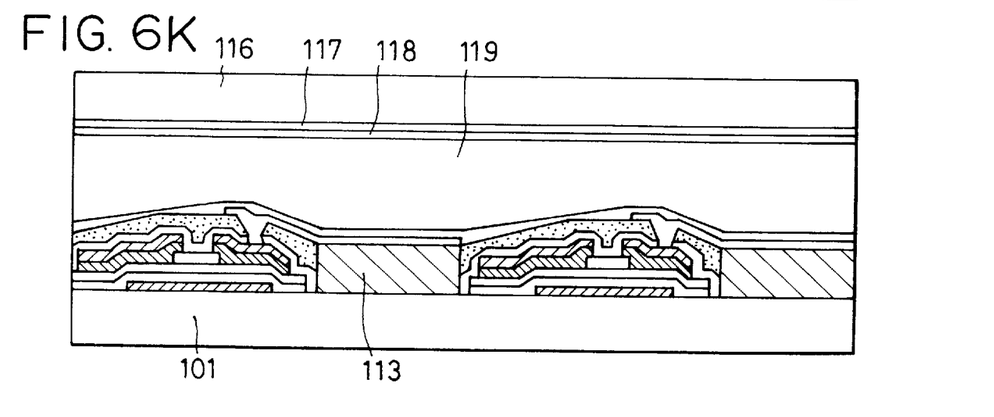

A glass substrate 116 provided with a common transparent electrode 117 and an alignment film 118 and a glass substrate 101 provided with a TFT and a color filter 113 are arranged opposite each other, and the gap between these two electrodes is filled with liquid crystal 119.

Inks used in the present invention are also usable in ink jet processes for printing on paper, films and the like, as well as for color filter production. The inks give clear images and have good water-proof properties.

In the above-mentioned embodiments, the production steps are described using an ink jet process which is preferred in the present invention. Other ink charging processes may also be used.

EXAMPLES

The present invention will now be described in more detail with reference to examples.

Example 1-1

A black pigment resist CK-S171B made by Fuji-Hunt Electronics Technology Co., Ltd. was applied on a glass substrate by a spin coating process such that the film thickness was 1.0 μm, exposed, developed and treated with heat to form a black matrix having a thickness of 1.0 μm. R, G and B inks were discharged on openings by an ink jet printer.

Ink formulations were as follows, wherein "pbw" means parts by weight and the formulations are based on one hundred parts:

(Red (R) ink)

| C. I. Acid Red 118 | 5 pbw |
|---|---|
| Glycerol polyglycidyl ether | 1.5 pbw |

(DENACOL EX-313 made by Nagase Chemicals Ltd.)

| Acrylic acid-methyl methacrylate-hydroxyethyl methacrylate terpolymer | 3 pbw |
|---|---|
| N-methyl-2-pyrrolidone | 15 pbw |
| Ethylene glycol | 20 pbw |
| Ethanol | 2 pbw |
| Deionized water | 53.5 pbw |

(Green (G) ink)

| C. I. Acid Green 25 | 5 pbw |
|---|---|

Other constituents other than C. I. Acid Red 118 were the same as the R ink.

| C. I. Acid Blue 113 | 5 pbw |
|---|---|

Other constituents other than C. I. Acid Red 118 were the same as the R ink.

The three discharged inks were cured by heat treatment at 230° C. for 40 minutes to form a color filter for liquid crystal devices.

The color filter was observed under an optical microscope. No color mixing and color unevenness were observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 1-2

After a color filter was prepared as in Example 1-1, a two-pack thermosetting resin Optomer SS6500 made by Japan Synthetic Rubber Co., Ltd. was applied thereon by a spin coating process such that the film thickness was 1 μm, and cured by heat treatment at 230° C. for 30 minutes to form a protective film.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 1-3

A color filter was prepared as in Example 1-1, except that the following inks were used.

(Red (R) ink)

| C. I. Acid Red 118 | 5 pbw |
|---|---|
| Diglycerol polyglycidyl ether | 1 pbw |

(DENACOL EX-421 made by Nagase Chemicals Ltd.)

| Methacrylic acid-ethyl acrylate-hydroxyethyl methacrylate terpolymer | 3 pbw |
|---|---|
| Ethylene glycol monoethyl ether | 25 pbw |
| Ethylene glycol | 20 pbw |
| Isopropyl alcohol | 2 pbw |
| Deionized water | 44 pbw |

(Green (G) ink)

| C. I. Acid Green 25 | 5 pbw |
|---|---|

Other constituents other than C. I. Acid Red 118 were the same as the R ink.

(Blue (B) ink)

| C. I. Acid Blue 113 | 5 pbw |
|---|---|

Other constituents other than C. I. Acid Red 118 were the same as the R ink.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20 C. to 60° C. No problems occurred.

Example 1-4

A color filter was prepared as in Example 1-1, except that the following inks were used.

(Red (R) ink)

| C. I. Acid Red 254 | 5 pbw |
|---|---|
| Polyethylene glycol diglycidyl ether | 2 pbw |

(DENACOL EX-821 made by Nagase Chemicals Ltd.)

| | |
|---|---|
| Polyvinyl alcohol (PVA217 made by Kuraray Co., Ltd.) | 3 pbw |
| Ethylene glycol | 20 pbw |
| Isopropyl alcohol | 2 pbw |
| Acetylene glycol | 1 pbw |
| Deionized water | 67 pbw |

(Green (G) ink)

| | |
|---|---|
| C. I. Acid Green 25 | 5 pbw |

Other constituents other than C. I. Acid Red 254 were the same as the R ink.
(Blue (B) ink)

| | |
|---|---|
| C. I. Acid Blue 185 | 5 pbw |

Other constituents other than C. I. Acid Red 254 were the same as the R ink.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 1-5

A color filter was prepared as in Example 1-1, except that a black pigment resist BK-416S made by Tokyo Ohka Kogyo Co., Ltd. was used instead of CK-S171B, the film thickness of the resist layer was 1.2 μm, and the following inks were used.
(Red (R) ink)

| | |
|---|---|
| C. I. Pigment Red 177 | 4 pbw |
| Pentaerythritol polyglycidyl ether | 0.8 pbw |

(DENACOL EX-4111 made by Nagase Chemicals Ltd.)

| | |
|---|---|
| Acrylic acid-methyl methacrylate-hydroxyethyl methacrylate terpolymer | 2 pbw |
| N-methyl-2-pyrrolidone | 15 pbw |
| Ethylene glycol | 20 pbw |
| Isopropyl alcohol | 1 pbw |
| Deionized water | 57.2 pbW |

(Green (G) ink)

A Green ink was prepared as in the Red ink except that 5 pbw of C. I. Pigment Green 36 was used as a pigment and the amount of the deionized water was changed to 56.2 pbw.
(Blue (B) ink)

A Blue ink was prepared as in the Red ink except that 5 pbw of C. I. Pigment Blue 209 was used as a pigment and the amount of the deionized water was changed to 56.2 pbw.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 1-6

A black matrix was formed on a glass substrate as in Example 1-1. An ink receiving layer comprising an acrylic acid/methyl methacrylate-hydroxymethyl methacrylate/N-methylolacrylamide quadripolymer was formed thereon such that the layer thickness was 1 μm. The R, G and B inks as in Example 2-1 were discharged onto the openings in the black matrix with an ink jet printer. The inks and the ink receiving layer were cured by heat treatment at 230° C. for 40 minutes.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 1-7

An example of an on-array type color filter will now be described with reference to FIGS. 6A to 6K. Herein, "on-array type" means that a color filter is provided on a substrate provided with a TFT.

A Cr gate electrode 102 having a thickness of approximately 2,000 angstroms was formed on a glass substrate 101. A $Si_3N_4$ insulating film 103 having a thickness of approximately 5,000 angstroms was formed on the gate electrode 102. An i-type amorphous silicon film 104 having a thickness of 2,000 angstroms and a SiN etching stop layer 105 were formed on the gate insulating film 103, followed by patterning of the etching stop layer 105.

An $n^+$-type amorphous silicon ohmic contact layer 106 having a thickness of approximately 3,000 angstroms was formed on the i-type amorphous silicon film 104 and the etching stop layer 105.

A source electrode 107 and a drain electrode 108, which were composed of Al, were formed on the ohmic contact layer 106, and the unnecessary sections of the i-type amorphous silicon film 104 and the gate insulating film 103 were removed by an etching process to form a TFT 109.

The TFT 109 was covered with a SiN passivation film 110, and a light screening layer 111 composed of carbon black was formed thereon, followed by mask exposure. The passivation film 110 and the light screening layer 111 on the opening sections were removed by developing them to form a contact hole 112 on the drain electrode 108.

The same R, G and B inks as in Example 1-1 were discharged on the open region 120 by an ink jet process and cured by heat treatment at 230° C. for 40 minutes, thus forming a color filter 113.

An ITO transparent pixel electrode 114 was formed on the color filter 113 so as to be connected to the drain electrode 108 through the contact hole 112. A polyimide alignment film 115 was formed on the entire surfaces of the TFT 109 and transparent pixel electrode 114.

The glass substrate 101 provided with the TFT 109 and color filter 113, and a glass substrate 116 provided with a common transparent electrode 117 and an alignment film 118 were arranged opposite each other and the gap between the two substrates was filled with liquid crystal 119.

No color mixing or color unevenness was observed in the resulting liquid crystal device, and no problems occurred during a series of processing steps. The resulting liquid crystal device was subjected to a successive 1,000 hour driving test at a temperature ranging from −20° C. to 60° C. No problems occurred.

Example 1-8

Using inks each having the same formulation other than the coloring agent, as the ink of Example 1-1, yellow, magenta, cyan and black solid images were recorded in close proximity on a Canon NP-DRY copy paper with an ink jet recording apparatus provided with a drop on-demand-type multi-recording head which discharges inks by means of thermal energy in response to recording signals. The printed paper was heated to fix the inks. The following coloring agents were used.
(Black)
  C. I. Food Black 2
(Yellow)
  C. I. Direct Yellow 86
(Magenta)
  C. I. Acid Red 35
(Cyan)
  C. I. Direct Blue 199

Boundaries between different color inks including the black ink were observed. No color bleeding or nonuniform color mixing was observed.

The printed paper was immersed in tap water for 5 minutes to test for a change in printed density. The printed density did not change due to the immersion.

Comparative Example 1

A black pigment resist CK-S171B made by Fuji-Hunt Electronics Technology Co., Ltd. was applied on a glass substrate by a spin coating process such that the film thickness was 1.0 μm, then was exposed, developed and treated with heat to form a black matrix having a thickness of 1.0 μm. The following R, G and B inks were discharged on the matrix openings by an ink jet printer.

| (Red (R) ink) | |
| --- | --- |
| C. I. Acid Red 118 | 5 pbw |
| Acrylic acid-methyl methacrylate-hydroxyethyl methacrylate terpolymer | 4.5 pbw |
| N-methyl-2-pyrrolidone | 15 pbw |
| Ethylene glycol | 20 pbw |
| Ethanol | 2 pbw |
| Deionized water | 53.5 pbw |
| (Green (G) ink) | |
| C. I. Acid Green 25 | 5 pbw |
| Other constituents other than C. I. Acid Red 118 were the same as the R ink. | |
| (Blue (B) ink) | |
| C. I. Acid Blue 113 | 5 pbw |
| Other constituents other than C. I. Acid Red 118 were the same as the R ink. | |

The three discharged inks were cured by heat treatment at 230° C. for 40 minutes to form a color filter.

The color filter was observed under an optical microscope. Color mixing and color unevenness were observed.

Using the color filter, a series of steps, i.e., ITO electrode formation, alignment film formation, and encapsulation of a liquid crystal composition, were performed to prepare a color liquid crystal device as shown in FIG. 3. R, G and B color densities significantly decreased during these steps and some cracks were found in the color filter.

Example 2-1

A black pigment resist CK-S171B made by Fuji-Hunt Electronics Technology Co., Ltd. was applied on a glass substrate by a spin coating process such that the film thickness was 0.8 μm; then it was exposed, developed and treated with heat to form a black matrix having a thickness of 0.8 μm. R, G and B inks were discharged on the matrix openings by an ink jet printer.

Ink formulations were as follows:

| (Red (R) ink) | |
| --- | --- |
| C. I. Acid Red 118 | 5 pbw |
| Dimethylolurea (Sumitex Resin ULW made by Sumitomo Chemicals Co., Ltd.) | 2 pbw |
| Acrylic acid-methyl methacrylate-hydroxyethyl methacrylate terpolymer | 4 pbw |
| Ethylene glycol monoethyl ether | 15 pbw |
| Ethylene glycol | 20 pbw |
| Isopropyl alcohol | 2 pbw |
| Deionized water | 52 pbw |
| (Green (G) ink) | |
| C. I. Acid Green 25 | 5 pbw |
| Other constituents other than C. I. Acid Red 118 were the same as the R ink. | |
| (Blue (B) ink) | |
| C. I. Acid Blue 113 | 5 pbw |
| Other constituents other than C. I. Acid Red 118 were the same as the R ink. | |

Other constituents other than C. I. Acid Red 118 were the same as the R ink.

The three discharged inks were cured by heat treatment at 200° C. for 60 minutes to form a color filter for liquid crystal devices.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 2-2

After a color filter was prepared as in Example 2-1, a two-pack thermosetting resin Optomer SS6500 made by Japan Synthetic Rubber Co., Ltd. was applied thereon by a spin coating process such that the film thickness was 1 μm, and cured by heat treatment at 230° C. for 30 minutes to form a protective film.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 2-3

A color filter was prepared as in Example 2-1, except that the following inks were used.

| (Red (R) ink) | |
| --- | --- |
| C. I. Acid Red 118 | 5 pbw |
| Dimethylolhydroxyethyleneurea | 1.5 pbw |
| (Sumitex Resin NS-3 spe made by Sumitomo Chemicals Co., Ltd.) | |
| Methacrylic acid-ethyl acrylate-hydroxyethyl methacrylate terpolymer | 3 pbw |
| Ethylene glycol monoethyl ether | 20 pbw |
| Ethylene glycol | 20 pbw |
| Isopropyl alcohol | 2 pbw |
| Deionized water | 48.5 pbw |
| (Green (G) ink) | |
| C. I. Acid Green 25 | 5 pbw |
| Other constituents other than C. I. Acid Red 118 were the same as the R ink. | |
| (Blue (B) ink) | |
| C. I. Acid Blue 113 | 5 pbw |
| Other constituents other than C. I. Acid Red 118 were the same as the R ink. | |

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 2-4

A color filter was prepared as in Example 2-1, except that the following inks were used.

| (Red (R) ink) | |
| --- | --- |
| C. I. Acid Red 254 | 5 pbw |
| Dimethylolurea | 5 pbw |
| (Sumitex Resin ULW made by Sumitomo Chemicals Co., Ltd.) | |
| Polyvinyl alcohol | 5 pbw |
| (PVA117 made by Kuraray Co., Ltd.) | |
| Ethylene glycol | 20 pbw |
| Isopropyl alcohol | 2 pbw |
| Acetylene glycol | 1 pbw |
| Deionized water | 62 pbw |
| (Green (G) ink) | |
| C. I. Acid Green 25 | 5 pbw |
| Other constituents other than C. I. Acid Red 254 were the same as the R ink. | |
| (Blue (B) ink) | |
| C. I. Acid Blue 185 | 5 pbw |
| Other constituents other than C. I. Acid Red 254 were the same as the R ink. | |

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60° C. No problems occurred.

Example 2-5

A color filter was prepared as in Example 2-1, except that a black pigment resist BK-739P made by Shin-Nippon Chemical Industries Co., Ltd. was used instead of CK-S171B, the film thickness of the resist layer was 1.0 μm, and the following inks were used.
(Red (R) ink)

| C. I. Pigment Red 177 | 4 pbw |
| --- | --- |
| Dimethylolurea | 2 pbw |

(Sumitex Resin ULW made by Sumitomo Chemicals Co., Ltd.)

| Acrylic acid-methyl methacrylate-hydroxyethyl methacrylate terpolymer | 4 pbw |
| --- | --- |
| N-methyl-2-pyrrolidone | 15 pbw |
| Ethylene glycol | 20 pbw |
| Isopropyl alcohol | 1 pbw |
| Deionized water | 54 pbW |

(Green (G) ink)

A Green ink was prepared as in the Red ink except that 5 pbw of C. I. Pigment Green 36 was used as a pigment and the amount of the deionized water was changed to 53 pbw.
(Blue (B) ink)

A Blue ink was prepared as in the Red ink except that 5 pbw of C. I. Pigment Blue 209 was used as a pigment and the amount of the deionized water was changed to 53 pbw.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20° C. to 60°C. No problems occurred.

Example 2-6

A black matrix was formed on a glass substrate as in Example 2-1. An ink receiving layer comprising an acrylic acid/methyl methacrylate-hydroxymethyl methacrylate/N-methylolacrylamide quadripolymer was formed thereon such that the layer thickness was 1 μm. The R, G and B inks as in Example 1-1 were discharged onto the openings in the black matrix with an ink jet printer. The inks and the ink receiving layer were cured by heat treatment at 220° C. for 30 minutes.

The color filter was observed under an optical microscope. No color mixing or color unevenness was observed.

Using the color filter, a series of steps, i.e., ITO electrode formation, alignment film formation, and encapsulation of a liquid crystal composition, were performed to prepare a color liquid crystal device as shown in FIG. 3. A liquid crystal was satisfactorily prepared.

The resulting liquid crystal device was subjected to a successive 1,000 hour driving test at a temperature ranging from −20 C. to 60° C. No problems occurred.

Example 2-7

An example of an on-array type color filter will now be described with reference to FIGS. 6A to 6K.

A Cr gate electrode 102 having a thickness of approximately 2,000 angstroms was formed on a glass substrate 101. A $Si_3N_4$ insulating film 103 having a thickness of approximately 5,000 angstroms was formed on the gate electrode 102. An i-type amorphous silicon film 104 having a thickness of 2,000 angstroms and a SiN etching stop layer 105 were formed on the gate insulating film 103, followed by patterning of the etching stop layer 105.

An $n_+$-type amorphous silicon ohmic contact layer 106 having a thickness of approximately 3,000 angstroms was formed on the i-type amorphous silicon film 104 and the etching stop layer 105.

A source electrode 107 and a drain electrode 108, which were composed of Al, were formed on the ohmic contact layer 106, and the unnecessary sections of the i-type amorphous silicon film 104 and the gate insulating film 103 were removed by an etching process to form a TFT 109.

The TFT 109 was covered with a SiN passivation film 110, and a light screening layer 111 composed of carbon black was formed thereon, followed by mask exposure. The passivation film 110 and the light screening layer 111 on the opening sections were removed by developing them, to form a contact hole 112 on the drain electrode 108.

The same R, G and B inks as in Example 2-1 were discharged on the open region 120 by an ink jet process and cured by heat treatment at 200° C. for 60 minutes, thus forming a color filter 113.

An ITO transparent pixel electrode 114 was formed on the color filter 113 so as to be connected to the drain electrode 108 through the contact hole 112. A polyimide alignment film 115 was formed on the entire surfaces of the TFT 109 and transparent pixel electrode 114.

The glass substrate 101 provided with the TFT 109 and color filter 113, and a glass substrate 116 provided with a common transparent electrode 117 and an alignment film 118 were arranged opposite each other and the gap between the two substrates was filled with liquid crystal 119.

No color mixing or color unevenness was observed in the resulting liquid crystal device, and no problems occurred during a series of processing steps. The resulting liquid crystal device was subjected to a successive 1,000 hour driving test at a temperature ranging from −20° C. to 60° C. No problems occurred.

Example 2-8

Using inks each having the same formulation other than the coloring agent, as the ink of Example 2-1, yellow, magenta, cyan and black solid images were recorded in close proximity on a Canon NP-DRY copy paper with an ink jet recording apparatus provided with a drop on-demand-type multi-recording head which discharges inks by means of thermal energy in response to recording signals. The printed paper was heated to fix the inks. The following coloring agents were used.

(Black)
  C. I. Food Black 2
(Yellow)
  C. I. Direct Yellow 86
(Magenta)
  C. I. Acid Red 35
(Cyan)
  C. I. Direct Blue 199

Boundaries between different color inks including the black ink were observed. No color bleeding or nonuniform color mixing was observed.

The printed paper was immersed in tap water for 5 minutes to test for a change in printed density. The printed density did not change due to the immersion.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink jet recording ink comprising a coloring agent, and a thermosetting resin composition comprising a multifunctional epoxide having at least two glycidyl groups and an acrylic resin.

2. An ink according to claim 1, wherein said multifunctional epoxide is selected from the group consisting of ethylene glycol diglycidyl ether, polyethylene glycol diglycidyl ether, propylene glycol diglycidyl ether, polypropylene glycol diglycidyl ether, neopentyl glycol diglycidyl ether, glycerol polyglycidyl ether, polyglycerol polyglycidyl ether, trimethylolpropane polyglycidyl ether, diglycerol polyglycidyl ether, sorbitol polyglycidyl ether, sorbitan polyglycidyl ether, pentaerythritol polyglycidyl ether, triglycidyl tris(2-hydroxyethyl) isocyanurate and adipic acid diglycidyl ether.

3. An ink according to claim 1, wherein said multifunctional epoxide is contained in said ink in an amount of 0.01 to 10 percent by weight.

4. An ink according to claim 1, wherein said acrylic resin is selected from the group consisting of polyacrylic acid, polymethacrylic acid, polyacrylate ester, polymethacrylate ester and polyhydroxymethyl methacrylate.

5. An ink according to claim 1, wherein said acrylic resin is contained in said ink in an amount of 0.05 to 20 percent by weight.

6. An ink according to claim 1, wherein said ink further comprises water and a water soluble organic solvent.

7. An ink jet recording ink comprising a coloring agent, and a thermosetting resin composition comprising a cellulose-reactive compound and a compound crosslinked by said cellulose-reactive compound.

8. An ink according to claim 7, wherein said cellulose-reactive compound is selected from the group consisting of dimethylolurea, dimethylolethyleneurea, dimethylolalkyltriazone, methylated dimethylolurone, dimethylol glyoxal monoureine and dimethylolpropyleneurea.

9. An ink according to claim 7, wherein said cellulose-reactive compound is selected from the group consisting of dimethylolurea and dimethylolethyleneurea.

10. An ink according to claim 7, wherein said cellulose-reactive compound is contained in said ink in an amount of 0.01 to 10 percent by weight.

11. An ink according to claim 7, wherein said compound crosslinked by said cellulose-reactive compound is selected from the group consisting of polyvinyl alcohol, acrylic resin, silicone resin, epoxy resin, cellulose derivative and polyvinylpyrrolidone.

12. An ink according to claim 11; wherein said acrylic resin is selected from the group consisting of polyacrylic acid, polymethacrylic acid, polyacrylate ester, polymethacrylate ester and polyhydroxymethyl methacrylate.

13. An ink according to claim 11, wherein said cellulose derivative is selected from the group consisting of hydroxypropyl cellulose, hydroxyethyl cellulose, methyl cellulose and carboxymethyl cellulose.

14. An ink according to claim 7, wherein said compound crosslinked by said cellulose-reactive compound is contained in said ink in an amount of 0.05 to 20 percent by weight.

* * * * *

UNITED STATES PATENT AND TRADEMARK OFFICE
CERTIFICATE OF CORRECTION

PATENT NO. : 6,084,006
DATED : July 4, 2000
INVENTOR(S) : Akio Kashiwazaki, et al.

Page 1 of 1

It is certified that error appears in the above-identified patent and that said Letters Patent is hereby corrected as shown below:

Column 4:
Line 66, "invention-is" should read --invention is--.

Column 14:
Lines 3 to 5 should be deleted.

Signed and Sealed this

Fourteenth Day of August, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,084,006
DATED : July 4, 2000
INVENTOR(S) : Akio Kashiwazaki et al.

It is certified that error appears in the above-identified patent and that said Letters Patent is hereby corrected as shown below:

Column 4,
Line 66, "invention-is" should read -- invention is --.

Column 14,
Lines 3 to 5, should be deleted.

Signed and Sealed this

First Day of January, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,084,006
DATED : July 4, 2000
INVENTOR(S) : Akio Kashiwazaki et al.

It is certified that error appears in the above-identified patent and that said Letters Patent is hereby corrected as shown below:

Column 18,
Lines 64-65, "An ink according to claim 1, wherein said ink further comprises water and a water soluble organic solvent." should read -- An ink jet recording ink comprising a coloring agent, and a thermosetting resin composition comprising a cellulose-reactive compound and a compound crosslinked by said cellulose-reactive compound. --.

Column 18, line 66, to Column 19, line 2,
"An ink jet recording ink comprising a coloring agent, and a thermosetting resin composition comprising a cellulose-reactive compound and a compound crosslinked by said cellulose-reactive compound." should read -- An ink according to claim 1 or 6, wherein said ink further comprises water and a water soluble organic solvent. --.

Column 19,
Line 3, "claim 7" should read -- claim 6 --.
Line 8, "claim 7" should read -- claim 6 --.
Line 11, "claim 7" should read -- claim 6 --.
Line 14, "claim 7" should read -- claim 6 --.

Column 20,
Line 11, "claim 7" should read -- claim 6 --.

Signed and Sealed this

Twenty-second Day of October, 2002

Attest:

Attesting Officer

JAMES E. ROGAN
Director of the United States Patent and Trademark Office